Feb. 7, 1967   H. E. BRANSON   3,302,402
HYDRAULIC FORCE TRANSMISSION SYSTEM
Filed Jan. 12, 1965   2 Sheets-Sheet 1

INVENTOR.
HENRY E. BRANSON
BY Parker & Carter
Attorneys.

Feb. 7, 1967   H. E. BRANSON   3,302,402
HYDRAULIC FORCE TRANSMISSION SYSTEM
Filed Jan. 12, 1965   2 Sheets-Sheet 2
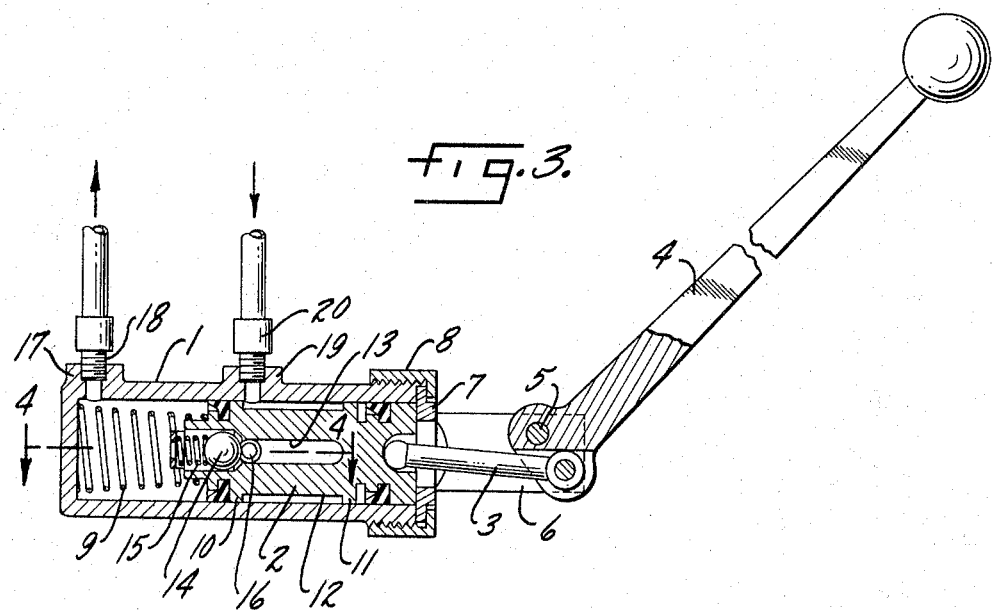
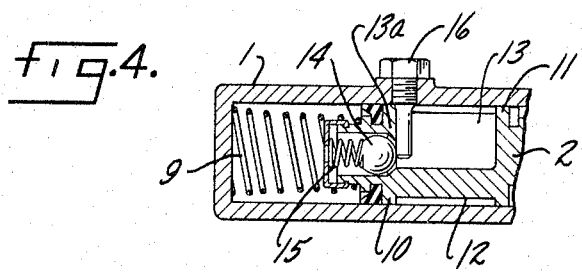
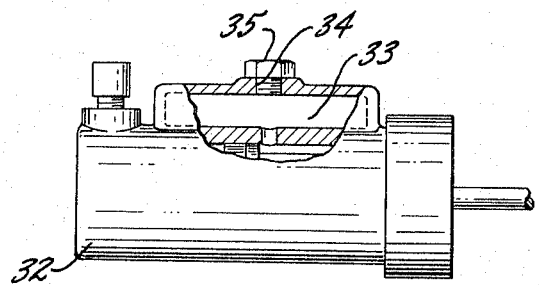
INVENTOR.
HENRY E. BRANSON
BY Parker & Carter
Attorneys.

United States Patent Office 3,302,402
Patented Feb. 7, 1967

3,302,402
HYDRAULIC FORCE TRANSMISSION SYSTEM
Henry E. Branson, Chicago, Ill., assignor to Stromberg Hydraulic Brake & Coupling Company, Chicago, Ill., a corporation of Illinois
Filed Jan. 12, 1965, Ser. No. 424,920
3 Claims. (Cl. 60—54.5)

This invention relates to improvements in power cylinders for hydraulic force transmission system and has for one object to provide a power cylinder which may be used interchangeably at one end of a line of cylinders in series or may be used as one of the cylinders in series.

Another object is to provide a combined power cylinder and hydraulic fluid reservoir which may be used interchangeably either as a master cylinder associated with hydraulic fluid reservoir or as an intermediate cylinder in series in a hydraulic line.

Other objects will appear from time to time throughout the specification and claims.

The proposed piston cylinder arrangement does everything that is done by the conventional master cylinder of an automobile hydraulic brake system but also makes it possible to use the cylinder interchangeably as a master cylinder or as one of a series of cylinders. In this connection, it must be remembered that the conventional hydraulic brake fluid master cylinder has a piston with a flexible packing sleeve which moves back and forth and which as it moves forward to apply pressure must first cut off the connection to the hydraulic brake fluid reservoir, which connection always takes the form of a port in the wall of the cylinder, which port is first closed by the flexible lip of the packing, the result being early disintegration of the lip. This defect is completely done away with by the present invention where intake and exhaust of the cylinders never comes in contact with the piston and the piston is always between them, sometimes closed and sometimes open to fluid gravel between the two sides of the system.

This invention is illustrated more or less diagrammatically in the accompanying drawings, wherein—

FIGURE 3 is a vertical section through the cylinder;

FIGURE 4 is a section along the line 4—4 of FIGURE 3;

FIGURE 5 is a side elevation in part section showing a modified form of cylinder.

Like parts are indicated by like numerals throughout the specification and drawings.

Figures 1, 2:
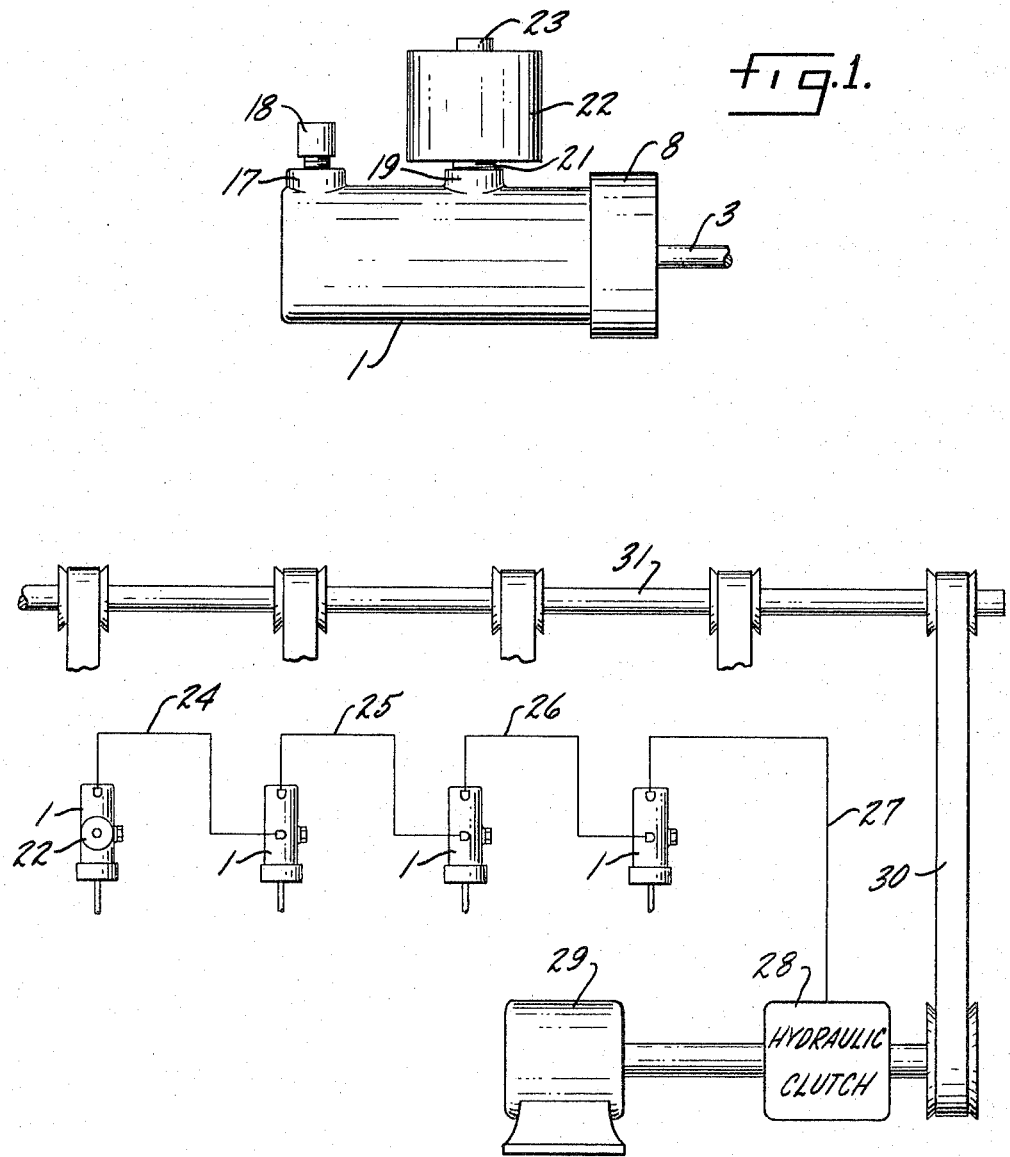
FIGURE 1 is a side elevation of a dual purpose cylinder.
FIGURE 2 is a diagrammatic illustration of a situation using such a cylinder.

The dual purpose power cylinder 1 is open at one end, closed at the other. The hollow piston 2 is mounted for reciprocation therein, being adapted to be reciprocated by a piston rod 3 actuated by a lever or other power source 4. The lever is pivoted at 5 on a strut 6 which extends downwardly from the annular ring 7 held in place in the open end of the cylinder by the nut 8. The annular ring 7 serves as a stop to limit the downward movement of the piston, biased outwardly thereagainst by the spring 9.

The piston is guided in the cylinder by an inner piston head 10 and an outer piston guide 11, the piston being reduced in diameter at 12 between the guide and the head. The heads are equipped with any suitable type of packing which makes a fluid tight fit with the wall of the cylinder. The recess 13 in the body of the piston communicates with the clearance or piston reduction 12 and the inboard or pressure end of the piston is closed at 13a by an apertured wall which forms a valve seat to receive the ball valve 14, biased toward the seat by the valve spring 15. Threaded in the wall of the cylinder 1 is a stud 16 which projects into the recess 13 and is so positioned that when the piston is at its outboard limit seated against the collar 7, the stud is engaged by the ball 14 to hold it off its seat.

A discharge sleeve 17 is integral with the wall of the cylinder 1 and defines an exhaust port and is interiorly threaded to receive the end of the discharge duct 18. This exhaust port is always on the downstream or pressure side of the piston.

An intake sleeve 19 integral with the cylinder 1 defines an intake port for the cylinder and is located always on the opposite side of the piston head 10. This sleeve 19 is threaded to receive either an intake duct 20 or the threaded coupling 21 of a hydraulic fluid reservoir chamber 22 which may be filled through the port 23. This chamber is always above the level of the cylinder 1, being always in connection with the interior of the cylinder through the clearance 12 and the recess 13 and past the valve 14, hydraulic fluid in this storage chamber may flow by gravity to the system.

When the lever 4 is manipulated to move the piston to the left to apply pressure, the instant the valve 14 leaves the pin 16 seats and pressure is applied to the system, there being no appreciable delay and no return of liquid from the cylinder and system to the reservoir.

If, on the other hand, the hydraulic reservoir is unscrewed and the intake duct replaces it then if pressure is applied through the intake duct 20 to the cylinder, it may pass right on through and out through the duct 18 as long as the piston is at its outboard position. Under these circumstances the lever is manipulated to apply pressure, the valve is seated and remains seated as pressure is applied by the lever except that if the pressure in the intake duct 20 is greater than the pressure in the cylinder, the valve will again be unseated.

In FIGURE 2 is illustrated a plurality of these cylinders 1. The first cylinder at the head of the line is associated with the reservoir 22, is connected by a duct 24 to the intake side of the next cylinder which in turn is connected by ducts 25, 26 to the intake side of each successive cylinder. The last cylinder in the system is connected as at 27 to a hydraulic clutch 28 or any other suitable hydraulically operated element interposed between a power source 29 and a power take off 30 which in turn drives a power shaft 31 associated with belts as indicated to drive any suitable piece of machinery. One piece of machinery in this case now shown, being associated with each of the cylinders.

The reservoir 22 is so related to the system that hydraulic fluid with all the pistons in their inoperative non-pressure applying position, may flow into each cylinder and along the ducts into the next one and so on but any one of the cylinders when pressure is applied applies pressure to the downstream but not to the upstream end of the duct system, all the cylinders being in series.

In the modified form shown in FIGURE 5, the dual purpose cylinder 32 in this case is interiorly threaded except that it is cast integral with a fluid reservoir 33. This fluid reservoir may be vented at 34 for filling or to prevent air lock when used as a master cylinder and may be closed by a plug 35 if desired or may be connected to an inlet duct 20, when this cylinder also acts as a dual purpose cylinder. Such a cylinder as 32 is of course more expensive than the cylinders 1 and under ordinary circumstances when a hydraulic system is to be assembled, a plurality of identical cylinders will be taken from stock, connected up as indicated in FIGURE 2 and the furthest out cylinder in the system will have screwed into it the hydraulic reservoir. Thus the installer needs to carry a substantial quantity of the cylinders with piston and lever combination and only a relatively smaller number of the removable interchangeable fluid reservoirs.

It is important to note in this connection that a wide range of possibilities of assembly thus become easily convenient. It is also important to note in sharp contrast with the usual type of master cylinder of the kind generally used with automotive brakes, etc. that the hydraulic fluid passes through the piston together with the removable or the integral fluid reservoir makes it possible to connect the piston and cylinder with the fluid source without the necessity of any opening or closing of the intake and exhaust ports in the cylinder because neither port ever is able to contact the piston and its packing.

While I have shown two types of cylinder, it will be obvious that the cylinder at the upstream end of the system might very well be the conventional type of master cylinder in common use in an automobile hydraulic brake system. The advantage of using the special type of cylinder here disclosed is that it may be used at the upstream end of the system and also may be used without change along the downwardly stages of the system. This is not possible without radical change with respect to the conventional master cylinder.

I claim:

1. An hydraulic system including a master power cylinder, having intake and discharge ports, an hydraulic duct system connected to the master cylinder discharge port, an hydraulic pressure responsive element connected to the duct system, a plurality of intermediate cylinders, having intake and discharge ports, between, in series with, and defining a normally unobstructed hydraulic pressure flow path between the power cylinder and the pressure responsive element, an hydraulic fluid supply source connected to the master cylinder intake port, independent means separately associated with the master and with each intermediate cylinder for applying hydraulic pressure to that part of the duct system on the downstream side of each exhaust port and for simultaneously obstructing the pressure flow path on the upstream side of the intake port, characterized by the fact that each cylinder both master and intermediate are in every respect interchangeable in the system.

2. The device of claim 1 characterized by the fact that an hydraulic fluid supply source may be independently and removably associated with each cylinder in the system.

3. The device of claim 1 characterized by the fact that an hydraulic fluid reservoir having an intake port is permanently associated with each cylinder and connected to the intake port thereof and that when a cylinder is used as an intermediate cylinder, the intake port of the reservoir is connected in series with the discharge port of the next upstream cylinder.

References Cited by the Examiner
UNITED STATES PATENTS

| | | | |
|---|---|---|---|
| 1,621,912 | 3/1927 | Van Der Wyk | 60—54.6 X |
| 2,254,890 | 9/1941 | Gardiner | 60—54.6 X |
| 2,299,932 | 10/1942 | Scott | 60—54.6 X |
| 2,441,040 | 5/1948 | Sprague et al. | 60—54.5 |
| 2,704,585 | 3/1955 | Stromberg | 60—54.5 X |
| 3,076,314 | 2/1963 | Stromberg | 60—54.5 |

MARTIN P. SCHWADRON, *Primary Examiner.*

ROBERT R. BUNEVICH, *Examiner.*